United States Patent [19]
Sakurai et al.

[11] Patent Number: 5,214,640
[45] Date of Patent: May 25, 1993

[54] HIGH-SPEED PACKET SWITCHING SYSTEM

[75] Inventors: Yoshito Sakurai, Yokohama; Takahiko Kozaki, Koganei; Shirou Tanabe, Hachioji, all of Japan

[73] Assignee: Hitachi, Ltd., Tokyo, Japan

[21] Appl. No.: 570,116

[22] Filed: Aug. 17, 1990

[30] Foreign Application Priority Data

Jan. 24, 1990 [JP] Japan .................. 2-012562

[51] Int. Cl.⁵ .............................. H04J 3/26
[52] U.S. Cl. ..................................... 370/60
[58] Field of Search .......... 370/60, 60.1, 94.1

[56] References Cited

U.S. PATENT DOCUMENTS

| | | | |
|---|---|---|---|
| 4,596,010 | 6/1986 | Beckner | 370/60 |
| 4,760,570 | 7/1988 | Acampora et al. | 370/60 |
| 4,837,761 | 6/1989 | Isono | 370/60 |
| 4,907,220 | 3/1990 | Rau | 370/60 |
| 5,018,129 | 5/1991 | Netravali et al. | 370/60 |

FOREIGN PATENT DOCUMENTS 59-135994 4/1984 Japan.
59-501034 7/1984 Japan.

*Primary Examiner*—Douglas W. Olms
*Assistant Examiner*—Melvin Marcelo
*Attorney, Agent, or Firm*—Antonelli, Terry, Stout & Kraus

[57] ABSTRACT

A switching system which comprises an initial stage including the plurality of first switch devices and in which respective input terminals of the plurality of first switch devices are connected in common to corresponding one incoming highway, and each first switch device selectively delivers to its output terminal an inputted packet in accordance with routing information of the packet so that packets of different outgoing highway numbers are delivered out of the output terminals of the respective first switch devices, and a final stage including the plurality of second switch devices and in which each output terminal of the respective second switch devices is connected to corresponding one outgoing highway, and respective input terminals of a particular second switch device are connected to respective output terminals of the first switch devices which deliver outgoing highways of the same numbers as those of outgoing highways connected to the particular second switch device.

15 Claims, 14 Drawing Sheets

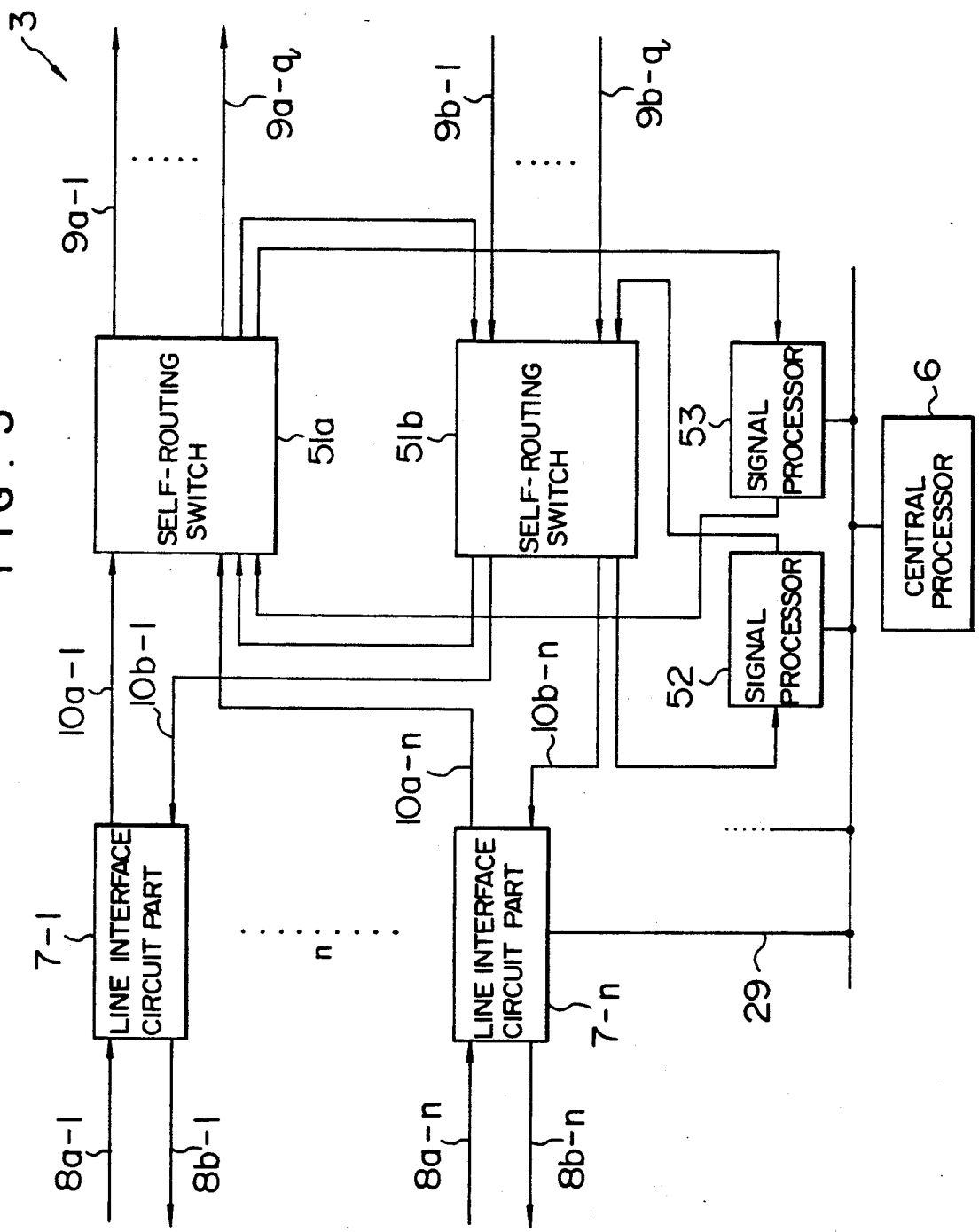

HIGH-SPEED PACKET SWITCHING SYSTEM

BACKGROUND OF THE INVENTION

The present invention relates to digital switching systems in the field of electronic communications and more particularly to improvements in construction of a speech path switch of a high-speed packet switching system which performs switching operation by using a fixed length packet.

In order to handle communications requiring high speed and wide band, the high-speed packet switching technique using a packet of a fixed length has been studied. One of features of the packet switching resides in that each packet has a header and a destination of each packet can be known from the header. In other words, the packet switching permits self-routing. Accordingly, high-speed switching operation can be ensured by reading the contents of the header through the use of hardware and carrying out switching in accordance with routing information described in the header. A typical example of this type of switch is disclosed in JP-A-59-135994 entitled "TDM Switching System".

On the other hand, for the purpose of constructing a large-scale speech path switch, it is general practice that switch elements each having a certain size are connected in multi-stage to expand the size. An example of this type of switch is disclosed in, for example, FIG. 5 of JP-A-59-501034 (corresponding to WO 84/00265) entitled "High-speed Packet Switching".

SUMMARY OF THE INVENTION

Conceivably, in the multi-stage high-speed packet switching system based on the prior art, the packet header can be provided with routing information (for example, outgoing highway number i.e., output port number) in the following two ways:

(1) Routing information pieces necessary for respective stages are all described in the header in advance; and (2) Routing information for one stage alone is described in the header and the routing information is rewritten stage by stage by looking up a header conversion table provided for each stage.

In the way (1), the number of bits representing the header is increased, resulting in an overhead which degrades the transfer efficiency of user information disadvantageously. In the way (2), on the other hand, the amount of hardware necessary for each stage switch is increased disadvantageously.

An object of the present invention is to provide a high-speed packet switching system using a self-routing switch which can be expanded using only routing information for one-stage switch.

To accomplish the above object, a switch arrangement according to the invention comprises two stages of a routing stage and an output stage. Specifically, in an embodiment of the invention, the switch arrangement may be constructed as follows.

When there are $k \times m$ incoming highways ($k \leq m$) and $j \times m$ outgoing highways ($j \leq k$), $k \times j$ routing stage switch elements ($j \leq k$) are provided. In other words, when one switch unit has j switch elements, k switch units are provided. All the incoming highways are sorted into k groups each having m highways and the respective groups of m highways are multi-connected to j switch elements of the corresponding one switch unit. The multi-connected j switch elements can deliver packets having routing information representative of outgoing highway numbers which are different from each other. On the other hand, $k \times j$ output stage switch elements are also provided. Namely, when one switch unit has k switch elements, j switch units are provided. And m outputs of each routing stage switch elements are sorted into k groups each having m/k outputs, whereby the k groups are respectively connected to k switch elements of the corresponding one switch unit in the output stage so that the individual switch units in the routing stage so that the individual switch units in the switch units in the output stage.

In the output stage, all of the m outputs of each switch elements are not used but m/k outputs are led from each switch element. In each output stage switch element, m/k outputs of m outputs are selected, with the view of meeting the sufficiency of one-stage routing information for handling a packet, in such a manner that output port terminal numbers of a particular output stage switch element coincide with output port terminal numbers of respective routing stage switch elements which are connected to the input of the particular output stage switch element. Consequently, output signals of different output port numbers can all be delivered from the output port terminals of one switch unit having k output stage switch elements.

Thus, a packet coming from an incoming highway is applied simultaneously to j routing stage switch elements of one switch unit. The respective j switch elements of each switch unit correspond to m outgoing highways and the j switch elements in all, that is, each switch unit has the function of distributing the packet to $j \times m$ outgoing highways. An output port number is described in the header of the packet and is represented by bits which are $\log(j \times m)$ in number where the logarithmic base is 2. Of $\log(j \times m)$ bits, $\log(j)$ bits are used for selecting one of the switch elements within one switch unit so that only a switch device corresponding to a destining output port number cf the packet can be selected. The remaining $\log(m)$ bits are used for routing within the selected switch device. Each switch unit in the output stage has the function of concentrating input signals from the k routing stage switch units. Since the output port number of each output stage switch element is so connected that the same port number as the output port terminal of the routing stage switch element connected to that output stage switch element can be selected as in the case of examples of FIGS. 1 and 13, routing in the output stage switch element can be effected using the same routing information as that for routing in the routing stage switch element.

In accordance with the present embodiment, a $(k \times m)$ inputs/$(j \times m)$ outputs switch can be constructed using a plurality of m inputs/m outputs switch elements. Further, the number of bits corresponding to the number of outgoing highways suffices to represent the requisite routing information.

According to the invention, a $(k \times m)$ inputs/$(j \times m)$ outputs switch can be constructed using a plurality of m inputs/m outputs switch devices ($m \geq k \geq j$). Further, the number of bits corresponding to the number of output circuits suffices to represent the requisite routing information.

For example, where $k = j = 2$ and $m = 32$, the routing information required for a 2-stage switch is of $\log(2 \times 32) + \log 32 = 11$ bits according to the prior art but is of $\log(2 \times 32) = 6$ bits according to the present invention. Since in a high-speed packet switching system to which the invention is applied the number of bits allowed for the routing information in the header is about 8 bits, the aforementioned difference is of significance.

BRIEF DESCRIPTION OF THE DRAWINGS

FIG. 5 is a block diagram showing an example of a self-routing switch;

DESCRIPTION OF THE PREFERRED EMBODIMENTS

The invention will now be described by using preferred embodiments thereof with reference to the accompanying drawings.

1. Switching System (1) Construction of Switching System

Figure 7:
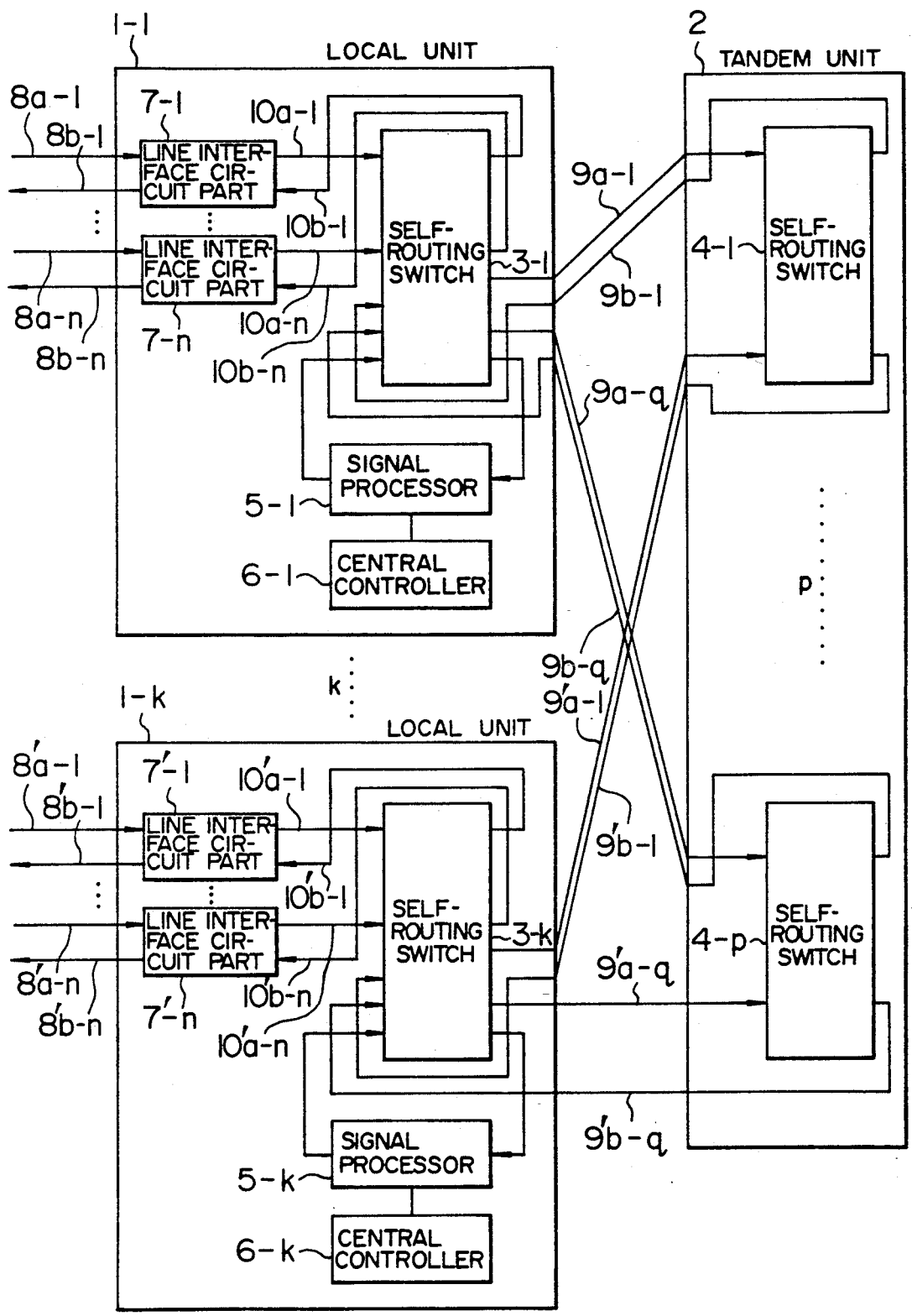
FIG. 7 is a block diagram showing an example of construction of the switching system to which the invention is applied.

FIG. 7 illustrates an example of the overall construction of a self-routing packet switching system to which the invention is applied. This system comprises k local units 1-*l* to 1-*k* for accommodating n packet lines (circuits) and a single tandem unit 2 connected to the local units. Each local unit 1 includes a self-routing switch 3 operable to switch a packet by self-routing, a signal processor 5 for terminating control signals, a central controller 6 for managing call process control and resource, and a line interface circuit part 7 operable to terminate lines and perform label conversion. The tandem unit 2 includes a plurality of self-routing switches 4-*l* to 4-*p*. Each local unit 1 is coupled to the tandem unit 2 by packet lines 9-*l* to 9-*q* and between desired originating/destinating local units, a plurality of routes exist which go through the self-routing switches 4-*l* to 4-*p* in the tandem unit 2.

A packet inputted from an incoming highway 8*a* is subjected to header conversion by means of the line interface circuit part 7 through the use of a conversion table which is set upon call set up and at the same time added with routing information. The packet is then sent to the self-routing switch 3, at which it is switched, and sent to another local unit via the tandem unit 2 (in some applications, returned to the local unit of its own without passing through the tandem unit).

It is to be noted that such a signal as a call set up signal is also transferred using a packet. In this case, a signal packet is sent to the signal processor 5 via the self routing switch.

(2) Structure of Packet Format

Figure 6A:
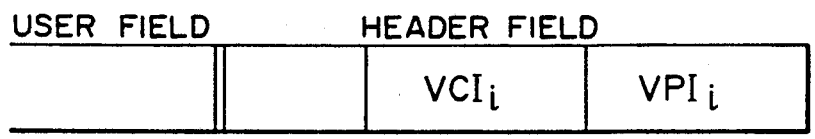
FIGS. 6A to 6C are diagrams showing examples of header formats.
Figure 6B:
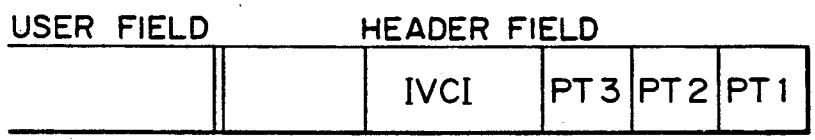
Figure 6C:
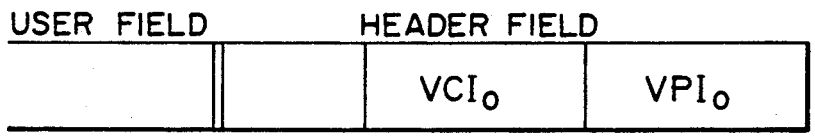

FIGS. 6A to 6C illustrate examples of structure of packet formats at different lines. A packet is divided into a header field and a user field and the header field is comprised of a VCI (Virtual Connection Identifier) area and a VPI (Virtual Path Identifier) area. A packet format appearing at the incoming highway 8*a* to an originating local unit has the packet header field set with an incoming highway VCI (VCIi) and an incoming highway (VPIe) as shown in FIG. 6A. FIG. 6B shows in particular a packet format appearing at a line between a line interface circuit part (for example, 7-*l*) of an originating local unit 1-*l* and a line interface circuit part 7'-*l* of a destination local unit (for example, 1-*k*), such as for example a line 10 between the line interface circuit part 7 and self-routing switch 3 or a line 9 between the local unit 1 and tandem unit 2. In the FIG. 6B format, the area corresponding to the VCIi area of FIG. 6A is set with IVCI (Internal VCI) and the area corresponding to the VPIi area is set with an output port number PT1 of the self-routing switch 3-*l* of the originating local unit 1-*l*, an output port number RT2 of the self-routing switch 4 of the tandem unit 2, and an output port number PT3 of the self-routing switch 3-*k* of the destination local unit 1-*k*. A packet format appearing at an output circuit 8'*b* of the destination local unit 3-*k* is set with an outgoing highway VCI (VCIo) and an outgoing highway VPI (VPIo) as shown in FIG. 6C.

(3) Construction of Line Interface Circuit Part

Figure 2:
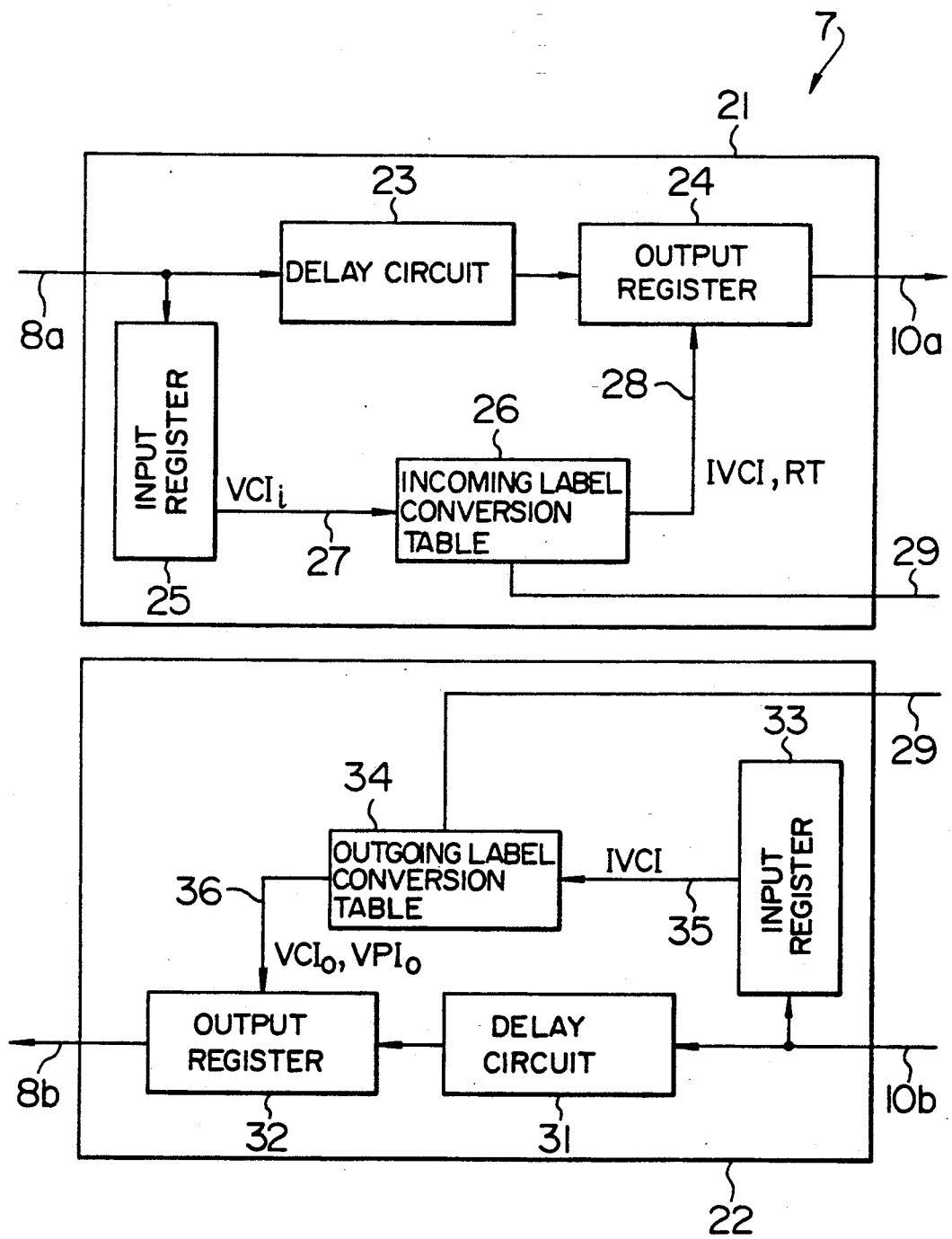
FIG. 2 is a block diagram of a line interface circuit part of a switching system to which the invention is applied.

The line interface circuit part 7 has a circuit construction as shown in FIG. 2. The line interface circuit part includes an upstream circuit 21 for processing a packet from the incoming highway 8*a* and delivering the processed packet to the packet line 10*a* connected to the tandem unit 2, and a downstream circuit 22 for processing a packet from a packet line 10*b* connected to the tandem unit 2 and delivering the processed packet to an outgoing highway 8*b*.

In the upstream circuit 21, the incoming highway 8*a* is connected to an input register 25 and also to an output register 24 via a delay circuit 23. The input register 25 has a VCI extraction line 27 through which a VCI is delivered to serve as a read address for an incoming label conversion table 26. The incoming label conversion table 26 has a data output line 28 connected to the output register 24 and the output register 24 is connected to the tandem unit 2.

In the downstream circuit 22, on the other hand, the output circuit 10*b* from the tandem unit 2 is connected to an input register 33 and is also connected to an output register 32 via a delay circuit 31. The input register 33 has an IVCI extraction line 35 through which an IVCI is delivered to serve as a read address for an outgoing label conversion table 34. The outgoing label conversion table 34 has a data output line 36 connected to the output register 32 which in turn is connected to the outgoing highway 8*b*.

(4) Label Conversion Table

Figure 3:
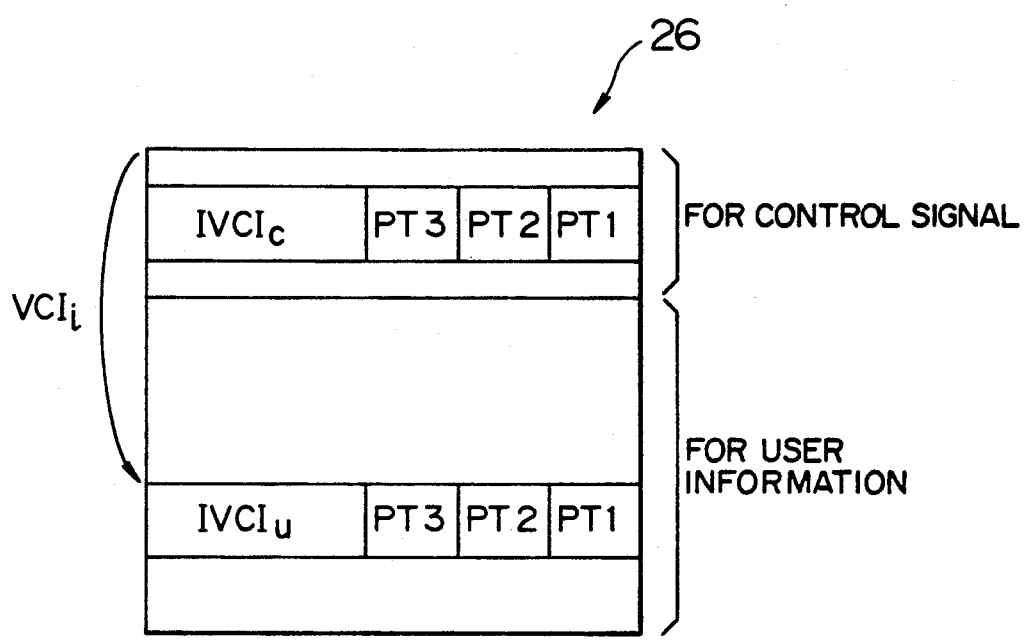
FIGS. 3 and 4 are diagrams showing examples of structure of label conversion tables.

FIG. 3 shows details of the incoming label conversion table 26. This table is divided into a control signal VCI area and a user signal information VCI area and the respective areas are set, in compliance with the VCI (VCIi) on the incoming highway 8a, with a VCI (IVCI) between the originating/destinating local units, an output port number PT1 of the self-routing switch 3 of the originating local unit, an output port number PT2 of the self-routing switch 4 of the tandem unit, and an output port number PT3 of the self-routing switch 3 of the destining local unit.

Figure 4:
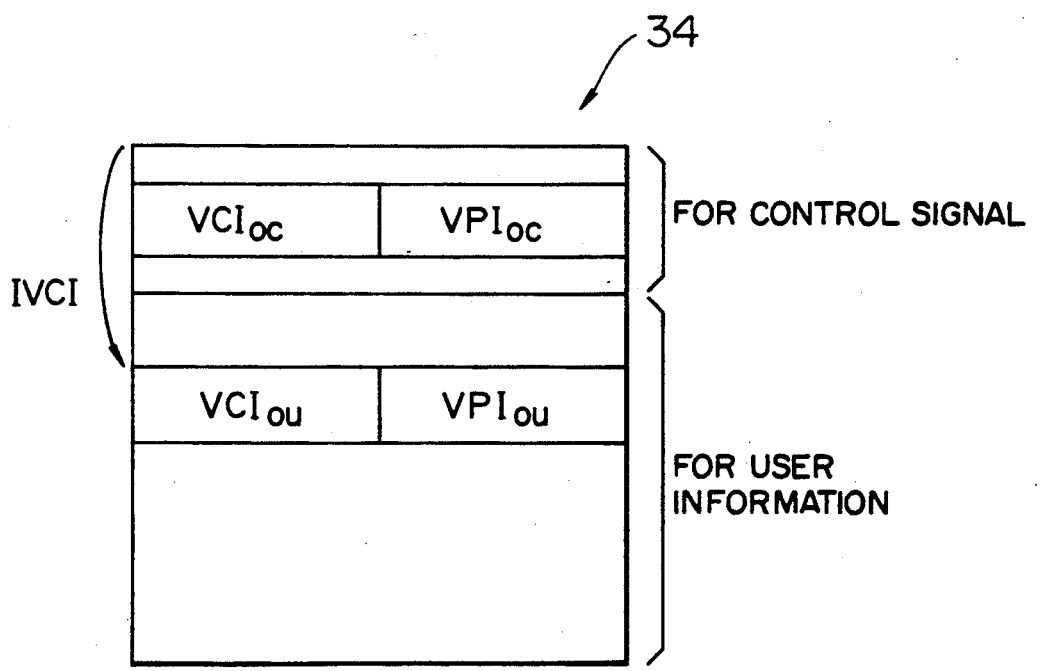

FIG. 4 shows details of the outgoing label conversion table 34. Like the incoming label conversion table 26, the table 34 is divided into a control signal area and a user information area and in compliance with the IVCI on the input circuit 10b from the tandem unit 2, the control signal area is set with an outgoing highway control VCI (VCIoc) and an outgoing highway control VPI (VPIoc) and the user information area is set with an outgoing highway user information VCI (VCIou) and an outgoing highway user information VPI (VPIou).

(5) Construction of Self-Routing Switch

Each of the self-routing switches 3 and 4 is a packet switch operable to select an output circuit in accordance with output port information and may be constructed of either a single switch or a plurality of switches in combination. Preferably, because of a large number of circuits to be accommodated, the packet switch used herein may be constructed of a plurality of switches in combination.

The self-routing switch 3 in the local unit is constructed as shown in FIG. 5. More particularly, the switch 3 includes an upstream circuit self-routing switch 51a connected to the output lines 10a of the line interface circuit parts 7-l to 7-n connected to the incoming highways 8a-l to 8a-n, and a downstream circuit self-routing switch 51b connected to the lines 9b-l to 9b-q. The output lines 9a-l to 9a-q of the upstream circuit self-routing switch 51a are connected to the tandem unit 2 and the output lines 10b-l to 10b-n of the downstream circuit self-routing switch 51b are connected to the line interface circuit parts 7-l to 7-n.

An upstream circuit signal processor 53 is connected to the upstream circuit self-routing switch 51a, a downstream circuit signal processor 52 is connected to the downstream circuit self-routing switch 51b, and these signal processors are coupled to the central processor via a processor bus 29.

Figure 1:
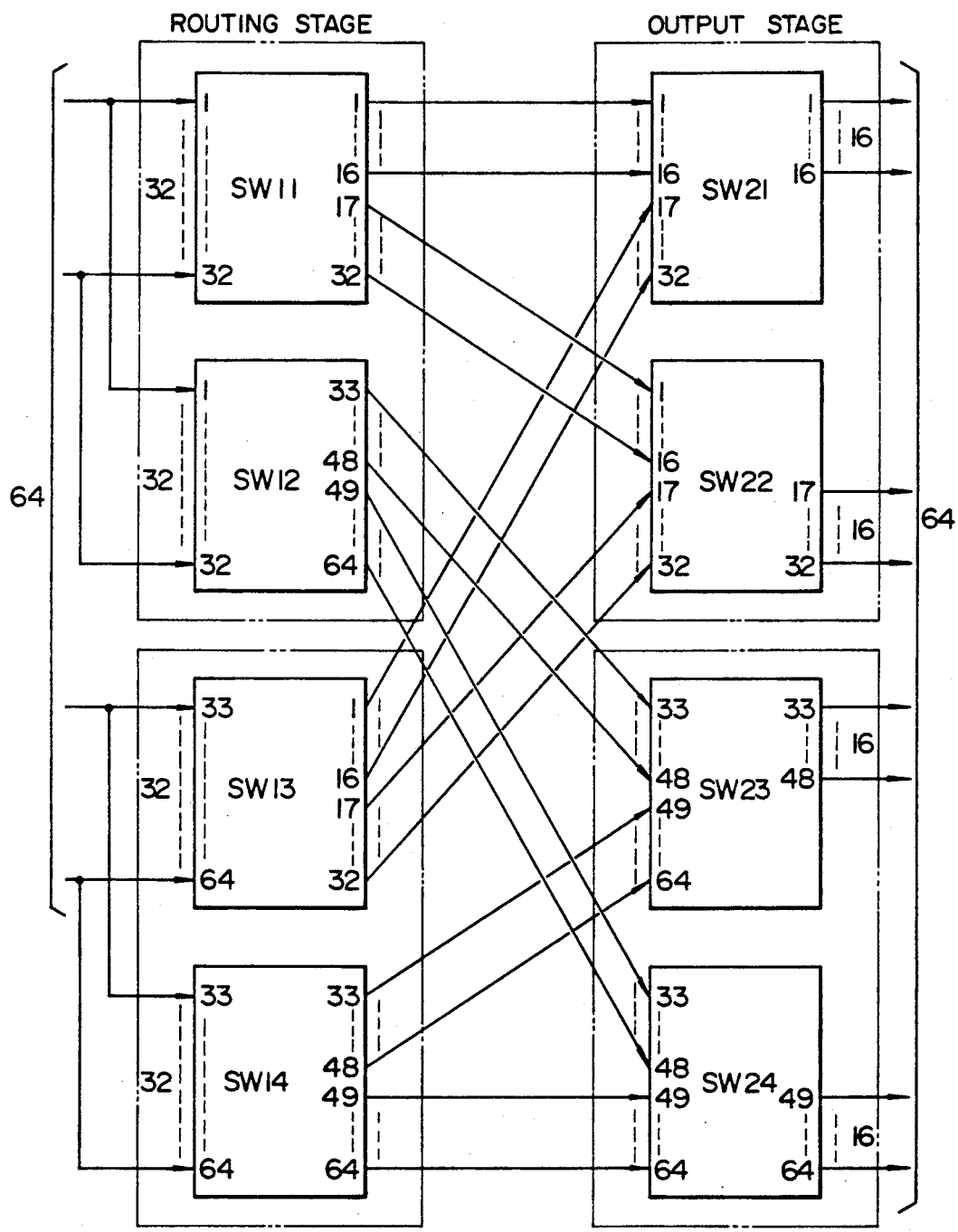
FIG. 1 is a connection diagram of a switch arrangement according to an embodiment of the invention.

FIG. 1 illustrates an example of internal construction of each of the self-routing switches 51a and 51b shown in FIG. 5. For simplicity of explanation, it is now assumed that the self-routing switch has 64 input lines (incoming highways) and 64 output lines (outgoing highways). The self-routing switch includes 4 routing stage switch elements (devices) SW11 to SW14 and 4 output stage switch elements (devices) SW21 to SW24. The 64 input lines are divided into 2 groups each having 32 input lines and each group is multi-connected to two routing stage switch elements (devices). Two switch devices SW11 and SW12 of the routing stage which are multi-connected to each other constitutes one switch unit and similarly, two switch devices SW13 and SW14 also constitute one switch unit. Each of the two switch devices SW11 and SW12 of the routing stage which are multi-connected to each other has 2 output groups each having 16 lines connected to a switch device of the output stage. The remaining two switch devices SW13 and SW14 are connected to the output stage switch in a similar manner. And, 16 output lines are led from each of the 4 output stage switch devices SW21 to SW24 to provide 64 output lines in total.

The switch device SW11 of the routing stage handles packets of output port numbers 1 to 32, and has its output port terminals 1 to 16 connected to the output stage switch device SW21 and its output terminals 17 to 32 connected to the switch device SW22. The switch device SW12 handles packets of output port Nos. 33 to 64, and has its output port terminals 33 to 48 connected to the switch device SW23 and its output port terminals 49 to 64 connected to the switch device SW24. In a similar manner, the switch device SW13 is connected to the switch devices SW21 and SW22 and the switch device SW14 is connected to the switch devices SW23 and SW24.

The routing stage switch device routes an input packet to an output port terminal of the same output port number as that indicated by the input packet.

In each output stage switch device, each of the output port terminals is connected to an outgoing highway of the same output port number as that of the output port terminal, and each of the input port terminals is connected to an output port terminal of the routing stage switch having the same output port number as that of the output port terminal of the output stage switch device.

In the output stage, the switch devices SW21 and SW22 corresponding to the outgoing highway Nos. 1 to 32 constitute one switch unit and the switch devices SW23 and SW24 corresponding to the outgoing highway Nos. 33 to 64 constitute one switch unit.

Switching operation of a packet will now be described in brief. Since in the example of FIG. 1 the number of the outgoing highways is 64, the number of bits representative of an output port number is 6, and the most significant bit is used to select one of the routing stage switch devices SW11 to SW14 and lower 5 bits are used for routing to corresponding one output port terminal within the selected switch device. For example, when the most significant bit is "0", the switch devices SW11 and SW13 are selected but when "1", the switch devices SW12 and SW14 are selected. Taking a packet arriving at input port No. 32, for instance, this packet is applied to the switch devices SW11 and SW12. If the output port number described in the header of the packet is 17 and the most significant bit in "0", the packet is routed by means of the SW11 and delivered out of output port No. 17. The application of the packet to the SW12 is therefore disregarded. Since the output port terminal No. 17 of the SW11 is connected to the SW22, that packet is inputted to the SW22. Because of the output port number described in the header being 17, the packet is again routed by means of the SW22 to output port terminal No. 17 thereof.

In this manner, the packet passes through the two stages of switches but only one piece of routing information indicative of output port No. 17 suffices. The switch arrangement of FIG. 1 is of 64 outputs and therefore the number of bits required for the routing information is 6 bits. If different routing information pieces are needed for the first and second stages, the number of bits must be 11 bits. This is because the routing stage needs 6 bits in total for selecting one of the switch devices and the output stage not requiring the switch device selection needs 5 bits in total. Typically, in many applications, the aforementioned type of information is processed in unit of 8 bits and the difference of 5 bits is of great significance.

Figure 8:
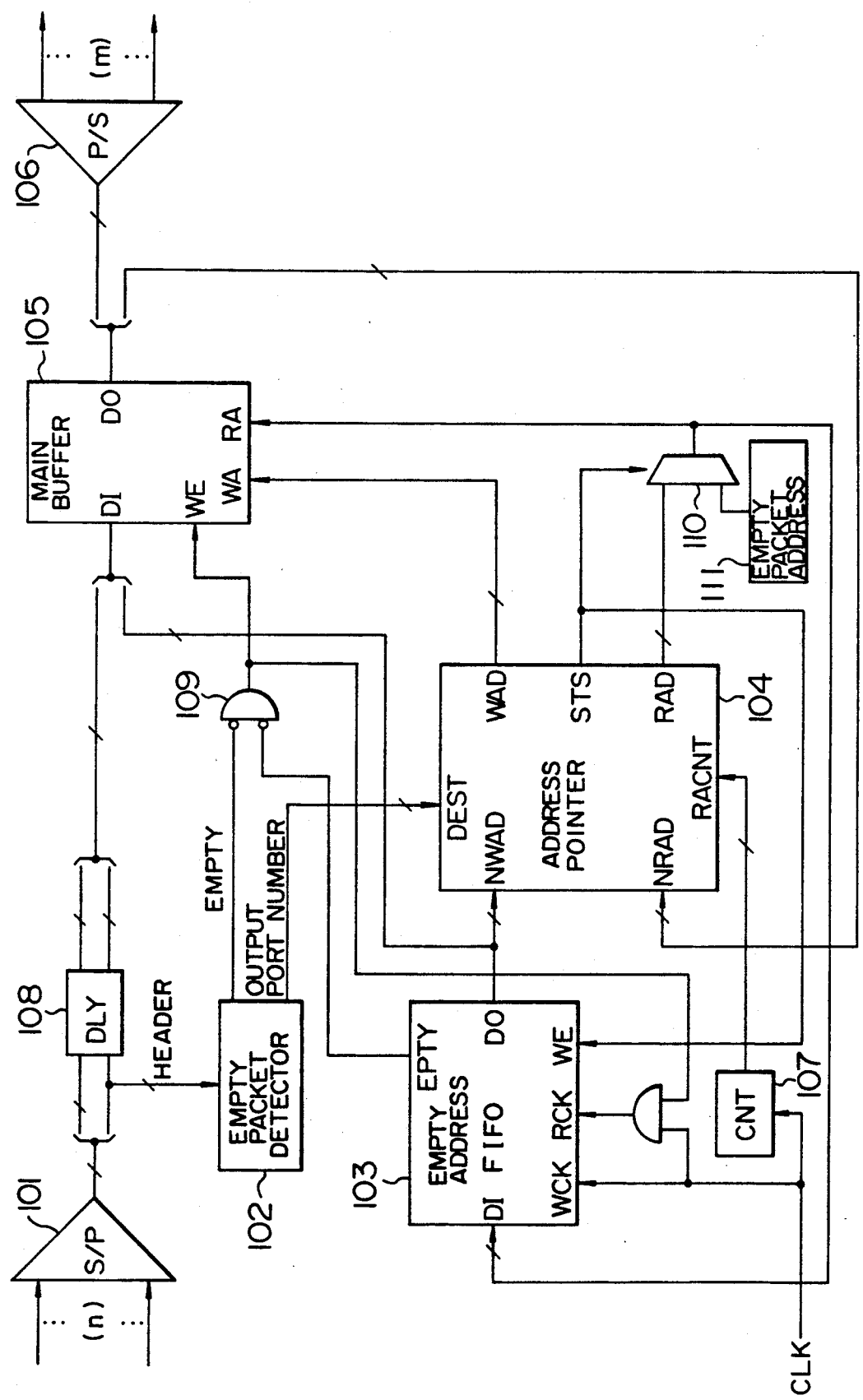
FIG. 8 is a block diagram showing details of a switch device in the FIG. 1 switch arrangement.

FIG. 8 illustrates an example of construction of the individual switch devices shown in FIG. 1 (for example, SW11), which is disclosed in, for example, U.S. Pat. No. 4,910,731. It is to be noted that the switch device of the present invention is not limited to that shown in the U.S. patent but may be constructed of other known switch devices. Referring to FIG. 8, n incoming highways are connected to a data input (DI) of a main buffer 105 via a series-parallel conversion multiplexer 101 and a data output (DO) of the main buffer 105 is connected to a parallel-series conversion demultiplexer 106 so that output data is demultiplexed to outgoing highways. A portion corresponding to the header of the packet delivered out of the series-parallel conversion multiplexer 101 also connects to an empty packet detector 102 to detect an empty packet. One output of the empty packet detector 102, that is, empty/busy information (empty=0) is connected to a write enable input WE of the main buffer 105 via an AND gate 109 and the other output, that is, an output port number (RT) is connected to a destining outgoing highway number input (DEST) of an address pointer 104. A data output DO of an empty address FIFO 103 is connected to the data input DI of the main buffer 105 and to a next write address input NWAD of the address pointer 104, and an empty indication output EMPTY is connected to the write enable input WE of the main buffer 105 via the AND gate 109. A write address output WAD of the address pointer 104 is connected to a write address input WA of the main buffer 105 and a read address output RAD is connected via a selector 110 to a read address output RA of the main buffer 105 and a data input DI of the empty address FIFO 103. The data output DO of the main buffer 105 has a portion which corresponds to a next read address and connects to a next read address NRAD of the address pointer 104 and the other portion corresponding to the packet entity is applied to the parallel-series conversion demultiplexer 106 so as to be demultiplexed to the individual outgoing highways. The output of a control counter 107 is connected to a read counter input RACNT of the address pointer 104. An empty address register 111 is connected to the other input of the selector 110. A queue state indication output STS of the address pointer 104 is connected to a selection input of the selector 110 and to a write enable input WE of the empty address FIFO 103.

Packet write operation of the main buffer will first be described.

Figure 9:
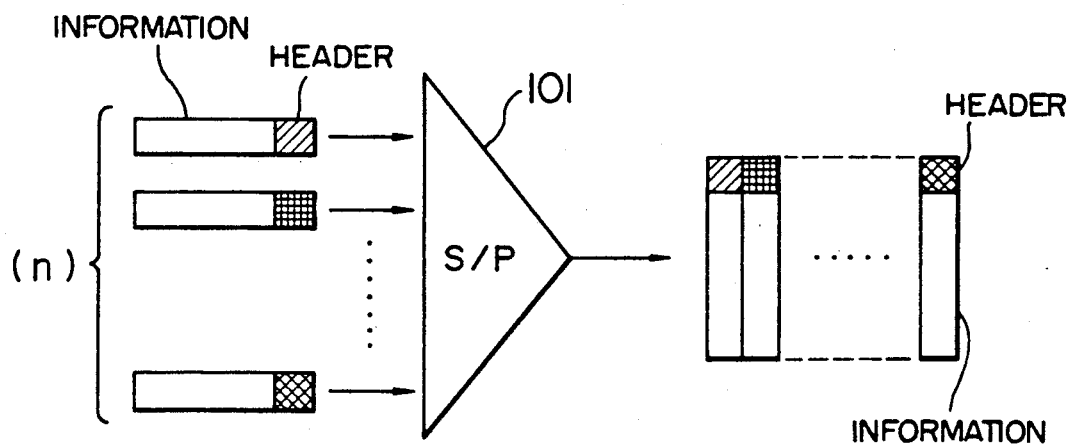
FIGS. 9, 10 and 11 are diagrams for explaining components in FIG. 8.

Packets coming from the individual incoming highways are subjected to parallel conversion by the series-parallel conversion multiplexer 101 so that the packet may easily be handled sequentially one by one. The concept of the series-parallel conversion multiplexing is diagrammatically shown in FIG. 9. Generally, the series-parallel conversion multiplexer may be constructed of a known circuit called a barrel shifter. An internal logical channel number and an output port number are described in the header of a packet, as shown in FIG. 6B, and by accessing the empty packet detector 102 by using these numbers, information as to whether that packet is empty or busy can be obtained.

The output port number of the packet is inputted to the address pointer 104 and a suitable write address is obtained in accordance with the output port number. The write address in question has precedently been inputted from the empty address FIFO 103. By using the write address, the packet is written into the main buffer 105. When the packet is an empty packet or when the empty address FIFO is empty (namely, the main buffer has no empty), the output of the AND gate 109 becomes low level (L), with the result that write into the main buffer 105 is not carried out and in addition a read clock (RCK) for the empty address FIFO becomes low level to prevent delivery of an empty address.

Read operation will now be described. In order to read a packet, a read address is produced from the address pointer 104 in accordance with a count generated from the control counter 107 and used as an address for reading the main buffer. The count value of the control counter corresponds to an output port number. Thus, packets are read one by one in order of output port number. The address used as the read address is sent to the data input DI of the empty address FIFO 103 and is again used as a write address. If no packet destined for an output port exists in the main buffer, a queue state indication output STS is delivered so that the selector 110 selects an address stored in the empty packet address register 111 as a read address for the main buffer 105. The contents of the main buffer corresponding to that address is always set to be an empty packet.

The data output of the empty address FIFO is stored, along with the packet, in the main buffer, thereby ensuring that a store address of a subsequent packet having the same destination as the output port of that packet can be indicated. Detailed operation will be described below with reference to FIG. 10.

Figure 10:
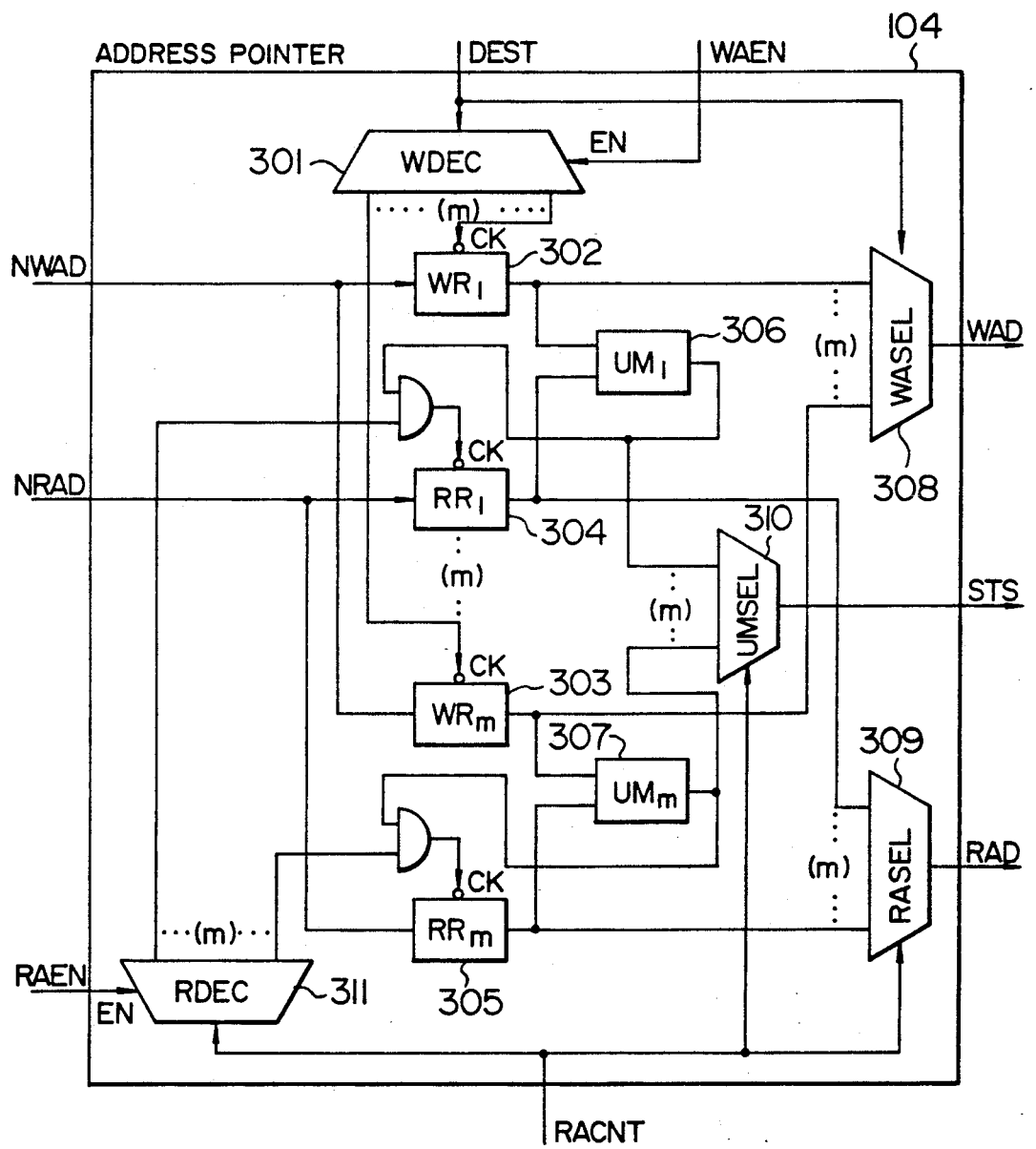

Construction and operation of the address pointer 104 will now be described with reference to FIG. 10. The output port number input DEST is connected to the input of an output port number decoder 301 and the selection input of a write address selector 308. The output port number decoder 301 has m decoded outputs respectively connected to clock inputs of m write registers (WR1 to WRm) 302 to 303. A next write address (NWAD) applied externally from the empty address FIFO is written in a write register WR thereby to output it through the write address selector 308 as a write address output signal (WAD). On the other hand, the control counter input RACNT is connected to the input of a decoder 311 and the selection input of a read address selector 309, and m decoded outputs of the decoder 311 are connected via gates to clock inputs of m read registers (RR1 to RRm) 304 to 305. An externally applied next read address input signal (NRAD) is connected to the input of each read register and an output signal of each read register passes through the read address selector 309 to provide a read address (RAD). Non-coincidence (or unmatch) detectors 306 to 307 have inputs respectively connected to outputs of the associated write and read registers and each detector produces an output signal which passes through a non-coincidence information selector 309 to provide a queue state indication signal (STS). The output of the non-coincidence detector is also connected to the other input of the aforementioned gate.

Responsive to an output port number input signal (DEST), the write address selector 308 selects one of the m write register outputs which corresponds to the output port number, thereby providing a write address output signal (WAD). Concurrently therewith, the decoded output signal of the output port number decoder 301 updates a value held in the aforementioned corresponding write register to a value (NWAD) inputted from the empty address FIFO. Accordingly, the NWAD value immediately before the updating corresponds to a write address which occurs when a packet next arrives having a destination identical to the output port number of the packet about to be written at that time. Therefore, by storing in the main buffer the NWAD value together with the packet to be written their at that time, it is possible to know which address a packet destined for the same outgoing highway as that of the packet now read should be read from at a next time since the NWAD value can be read from the main buffer together the packet. When reading a packet, the read address selector receiving at its selection input a value of the control counter selects the output of a read register, and a value held in that register is delivered as a read address output signal (RAD) and used as a read address. Concurrently therewith, the output signal of the decoder 311 updates the value held in the read register selected at that time. Since the signal inputted to the read register at that time is the next read address read out of the main buffer and is stored together with the packet upon the aforementioned writing, the address for the next packet destined for the same outgoing highway can be held in the read register.

Figure 11:
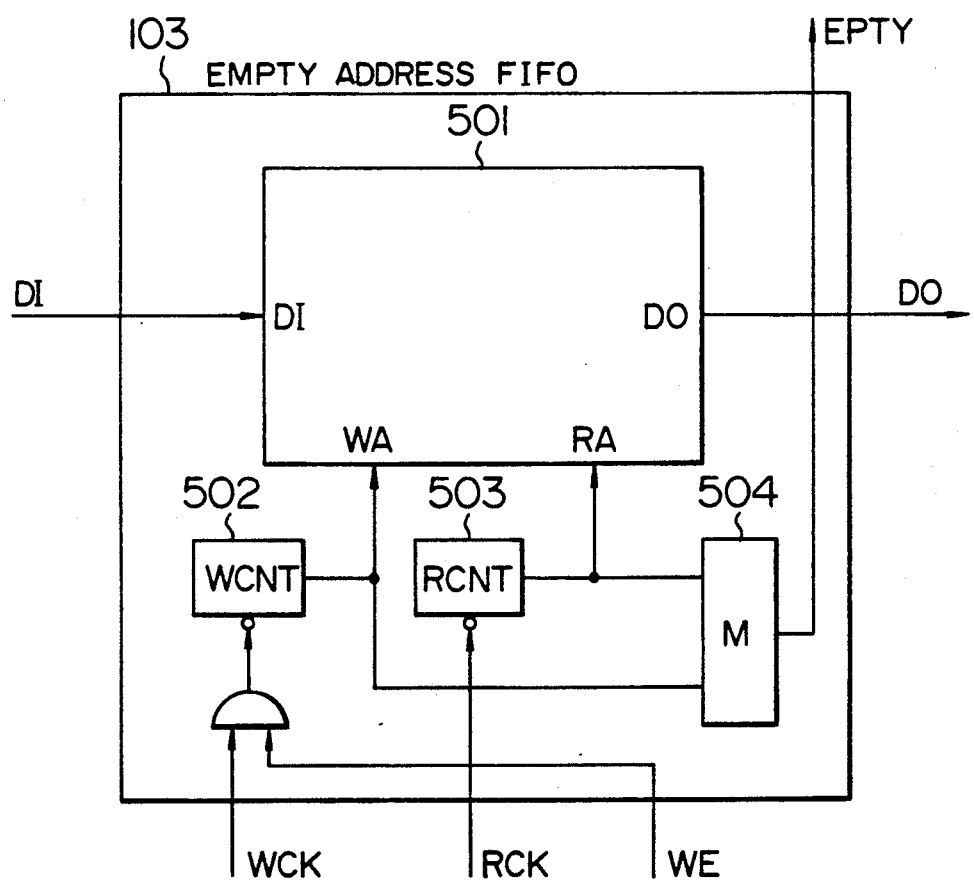

FIG. 11 illustrates an example of construction of the empty address FIFO 103. The empty address FIFO 103 includes a memory 501, a write counter (WCNT) 502, a read counter (RCNT) 503 and a coincidence detector 504. The write counter 502 is a counter for generating a write address (WA) and is of a ring counter operable to count the whole number of addresses of the memory 501. The read counter 503 is a counter for generating a read address (RA) and is of a ring counter operable to count the whole number of addresses of the memory 501. When values of the two counters coincide with each other, indicating that the memory becomes empty, the coincidence detector 504 detects the coincidence and delivers an empty output signal (EMPTY). As is clear from the above, the empty address FIFO 103 has the FIFO function as a whole.

(6) Example of General Expansion

Figure 12:
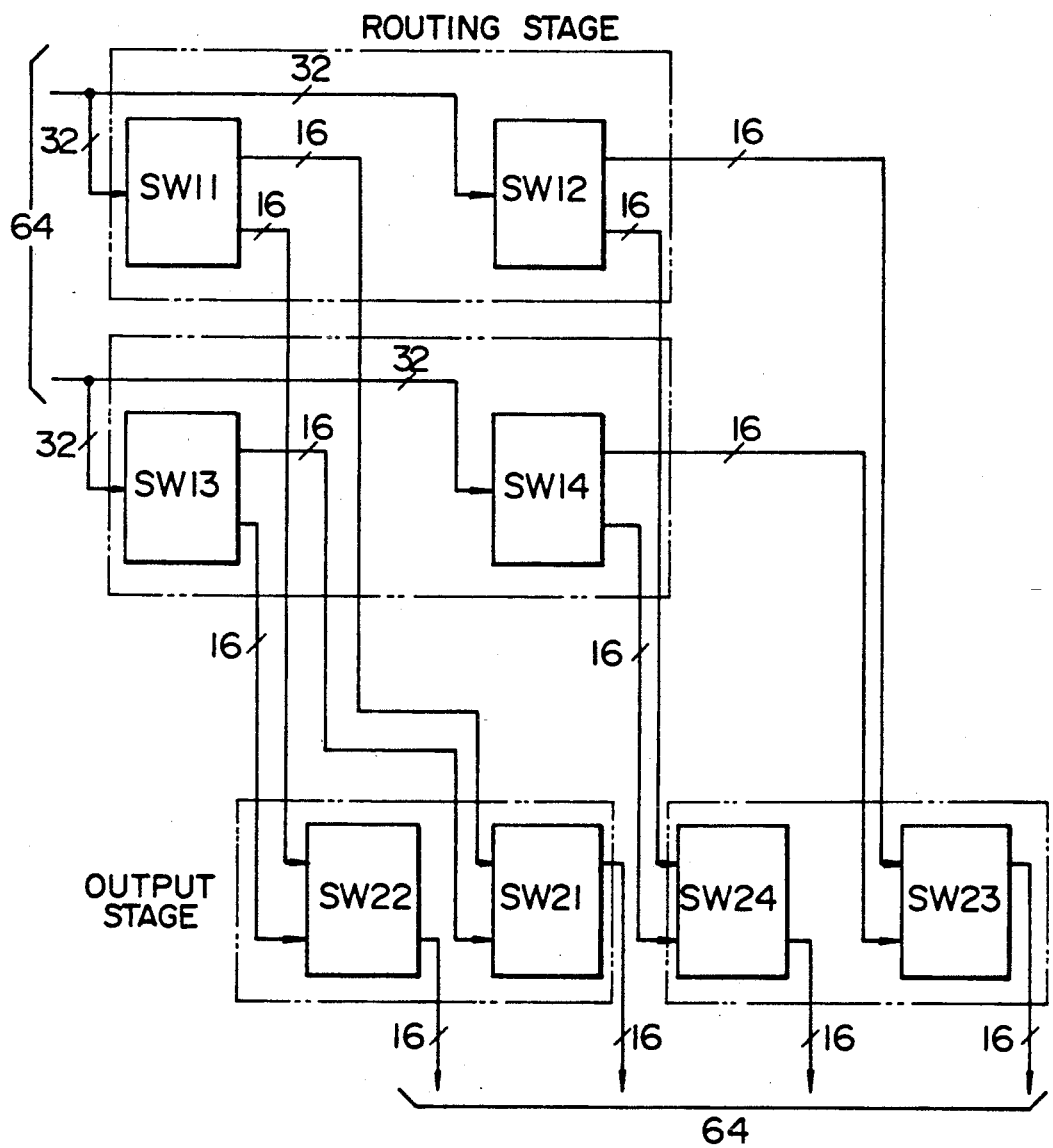
FIG. 12 is a connection diagram equivalent to FIG. 1.

By omitting wiring and changing layout in FIG. 1, there results an arrangement of FIG. 12 having equivalency to the FIG. 1 arrangement. The illustration of FIG. 12 intends to give assistance to understanding of FIG. 13. While FIG. 12 shows an example of 64 input lines 64 output lines, FIG. 13 shows an expansion of arbitrarily numbered input/output lines.

When the size of a single switch device is m inputs and m outputs and there are k×m input lines, k×k switch devices are provided in the routing stage and the k×m input lines are sorted into k groups each having m lines, whereby k sets are provided each having k switch devices to which each group of m lines is multiu-connected. Here, the k switch devices to which one group of m input lines is multi-connected constitute one switch unit. On the other hand, k×k output stage switch devices are also provided and m outputs of each routing stage switch device are sorted into k groups each having m/k outputs, whereby k sets are provided each having k output stage switch devices which are respectively connected with the respective k groups. Here, the k output stage switch devices constitute one switch unit. The connection between the routing and output stages is such that the respective k switch units of k switch devices in the routing stage are connected to all of the k switch units of k switch devices in the output state. In the output state, all of the m output port terminals of the switch device are not used but m/k output lines are led from each switch device. In each output stage switch device, m/k out of m output lines are selected, with the view of meeting the sufficiency of one-stage routing information for handling a packet, in such a manner that output port terminal numbers of a particular output stage switch device coincide with output port terminal numbers of respective routing stage switch devices which are connected to the input of the particular output stage switch device. Consequently, output signals of different output port numbers can all be delivered from the output port terminals of one switch unit having k output stage switch devices.

Figure 13:
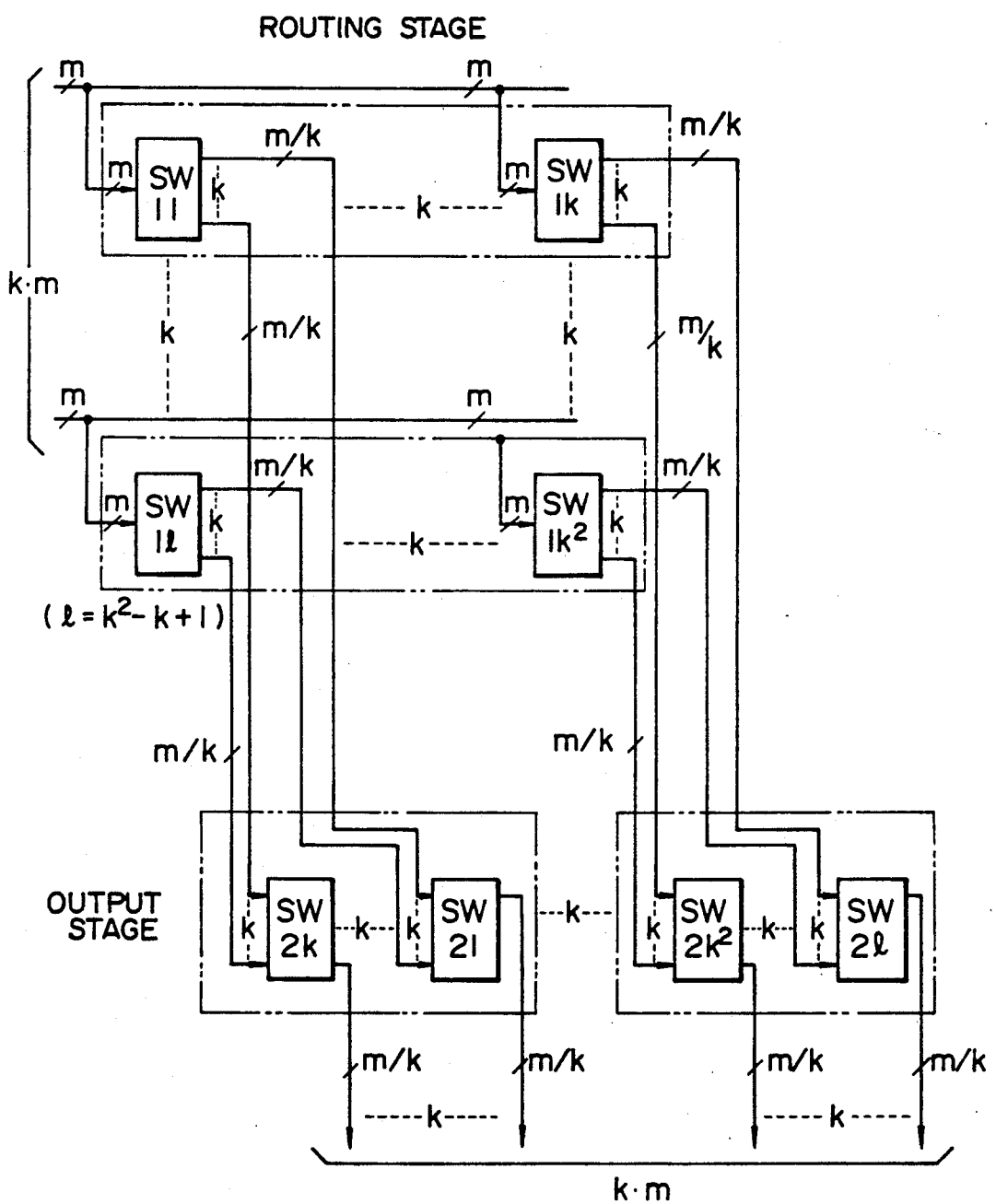
FIG. 13 is a connection diagram showing an example of expansion of the switch arrangement according to the invention.

Provided that the respective switch units in the output stage can connect to all of the switch units in the routing stage, any other wiring connection than that shown in FIG. 13 can be set up between the routing and output stages.

A packet coming from an input line (incoming highway) is applied simultaneously to k routing stage switch devices of one switch unit. The respective k switch devices of each switch unit correspond to m output lines (outgoing highways), and the k switch devices in all, that is, each switch unit has the function of distributing the packet to k×m output lines (outgoing highways). An output port number is described in the header of the packet and is represented by bits which are log(k×m) in number where the logarithmic base is 2 and this holds true for the following description. Of log(k×m) bits, log(k) bits are used for selecting one of the switch devices within one switch unit so that only a switch device corresponding to a destining output port number of the packet can be selected. The remaining log(m) bits are used for routing within the selected switch device. Each switch unit in the output stage has the function of concentrating input signals from the k routing stage switch units. Since the output port number of each output stage switch device is so connected that the same port number as the output port terminal of the routing stage switch device connected to that output stage switch device can be selected as in the case of the FIG. 1 example, routing in the output stage switch device can be effected using the same routing information as that for routing in the routing stage switch device.

In accordance with the present embodiment, a (k×m) inputs/(k×m) outputs switch can be constructed using a plurality of m inputs/m outputs switch devices. Further, the number of bits corresponding to the number of output lines (outgoing highways) suffices to represent the requisite routing information.

For example, where k=2 and m=32, the routing information required for a 2-stage switch is of log(2×32)+log32=11 bits according to the prior art but is of log(2×3)=6 bits according to the present invention. Since in a high-speed packet switching system to which the invention is applied the number of bits allowed for the routing information in the header is about 8 bits, the aforementioned difference is of great significance.

2. Concentration System (1) System Construction

Figure 14:
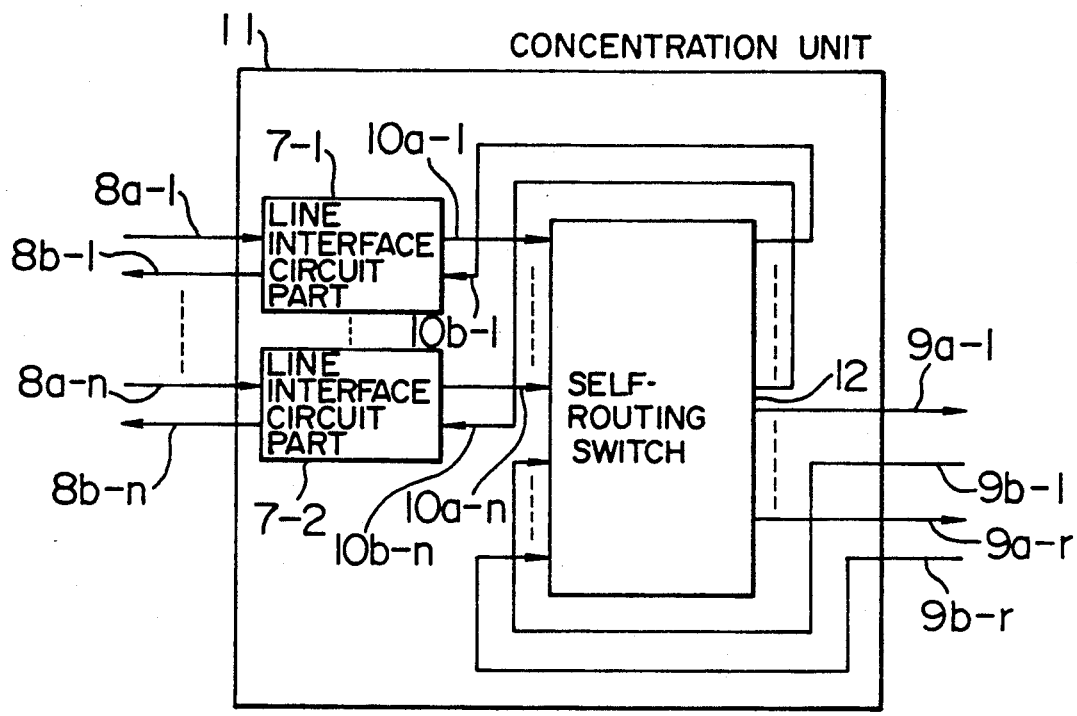
FIG. 14 is a block diagram showing an example of construction of a concentration system to which the invention is applied.

FIG. 14 illustrates a concentration unit constituting a concentration system to which the present invention is applied. The concentration system is formed of only the illustrated unit. The basic construction is obtained by removing the signal processor 5-1 and central controller 6-1 from the local unit of the switching system shown in FIG. 7.

(2) Construction of Self-routing Switch

Figure 15:
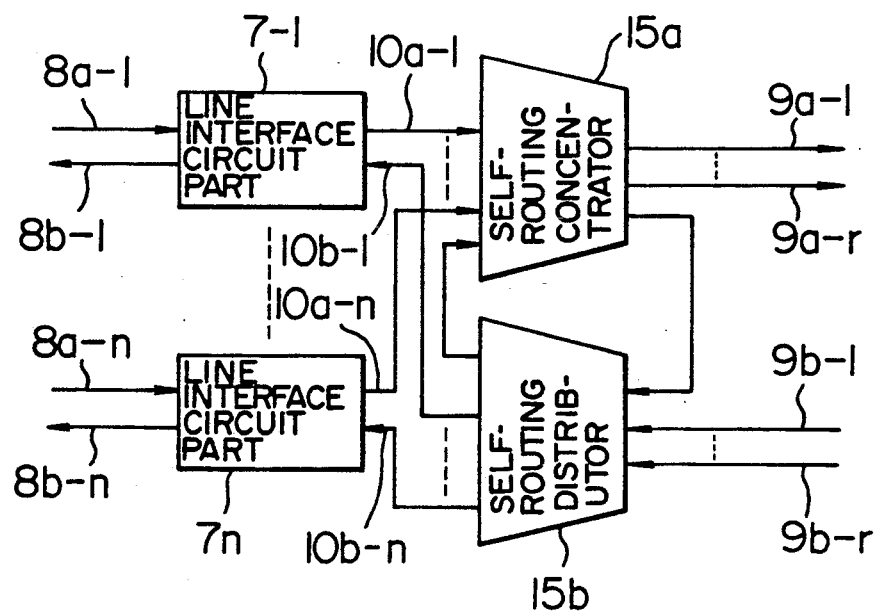
FIG. 15 is a block diagram showing an example of a self-routing switch in FIG. 14.

FIG. 15 illustrates an example of construction of a self-routing switch used in the concentration unit. An upsteream circuit is a self-routing concentrator in which the number of output lines is smaller than that of input lines, and a downstream circuit is a self-routing distributor in which the number of output lines is conversely larger than that of input lines.

(3) Construction of Concentrator

Figure 16:
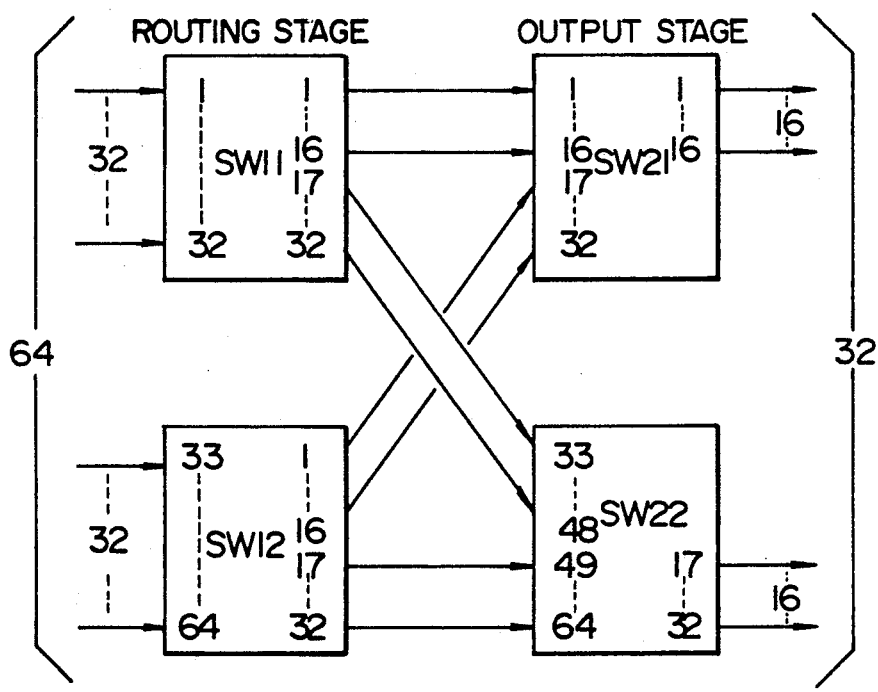
FIG. 16 is a connection diagram of a switch arrangement according to another embodiment of the invention.

FIG. 16 illustrates an example of construction of the self-routing concentrator. In this example, a plurality of 32 inputs/32 outputs switch devices are used to constitute a 64 inputs/32 outputs concentrator. There are provided 2 routing stage switch devices and 2 output stage switch devices. And, 64 input lines (incoming highways) are sorted into 2 groups each having 32 input lines and the two groups are connected to two routing stage switch devices SW11 and SW12, respectively. Outputs of each routing stage switch device are sorted into 2 groups each having 16 outputs, the two output groups being connected to different output stage switch devices SW21 and SW22. In each of the two output stage switch devices, 16 outputs are led to output lines (outgoing highways).

Like the arrangements of FIGS. 1, 12 and 13, the FIG. 16 arrangement is such that input port terminals of a particular output stage switch device are connected to output port terminals, of respective routing stage switch devices, having numbers identical to outgoing highway numbers of output port terminals of the particular output stage switch device.

As will be clearly understood from FIG. 16, whenever a packet having routing information directed to any one of 32 outgoing highway numbers arrives at any one of 64 input lines, the packet can be routed to a desired outgoing highway. As in the case of the FIG. 1 arrangement switching in both the routing and output stages can be effected using the same routing information (output port number).

(4) General Expansion

Figure 17:
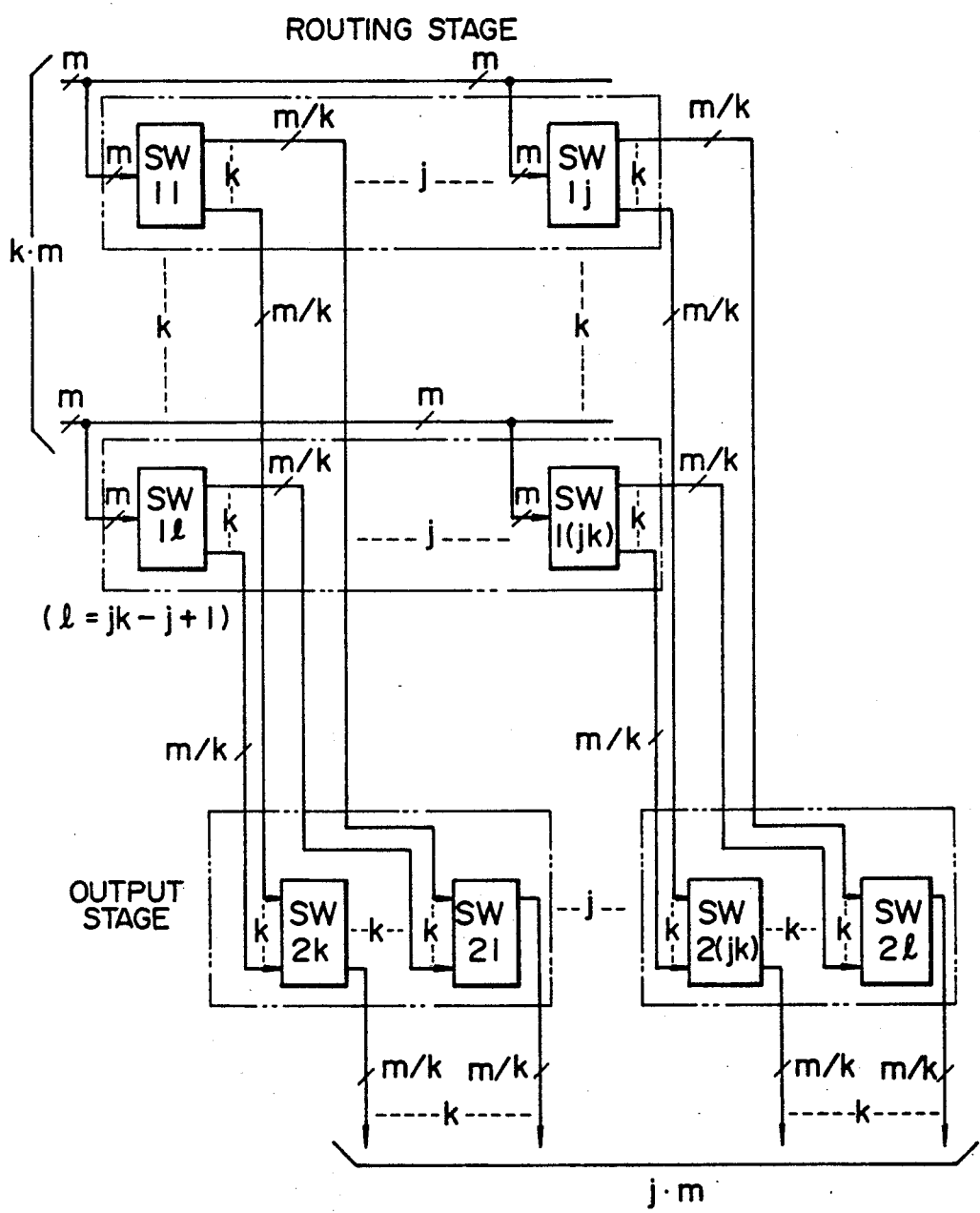
FIG. 17 is a connection diagram showing an example of expansion of the FIG. 16 switch arrangement.

The connection configuration shown in FIG. 16 can be generalized as shown in FIG. 17.

When the size of a single switch device is m inputs and m outputs and there are $k \times m$ input lines ($K \leq m$) and $j \times m$ output lines ($j \leq k$), $k \times j$ routing stage switch devices ($j \leq k$) are provided. In other words, when one switch unit has j switch devices, k switch units are provided. All the input lines are sorted into k groups each having m lines and the respective groups of m lines are multi-connected to j switch devices of the corresponding one switch unit. The multi-connected j switch devices can deliver packets having routing information representative of outgoing highway numbers which are different from each other. On the other hand, $k \times j$ output stage switch devices are also provided. Namely, when one switch unit has k switch devices, j switch units are provided. And m outputs of each routing stage switch device are sorted into k groups each having m/k outputs, whereby the k groups are respectively connected to k switch devices of the corresponding one switch unit in the output stage so that the individual switch units in the routing stage are respectively connected to all the switch units in the output stage. In the output stage, all of the m output lines of each switch device are not used but m/k output lines are led from each switch device. In each output stage switch device, m/k out of m output lines are selected, with the view of meeting the sufficiency of one-stage routing information for handling a packet, in such a manner that output port terminal numbers of a particular output stage switch device coincide with output port terminal numbers of respective routing stage switch devices which are connected to the input of the particular output stage switch device. Consequently, output signals of different output port numbers can all be delivered from the output port terminals of one switch unit having k output stage switch devices.

As described above, by connecting $m \times m$ switch devices in two stages, an expanded concentrator of $k \times m$ inputs/$j \times m$ outputs can be obtained.

Provided that the respective switch units in the output stage can connect to all of the switch units in the routing stage, any other wiring connection than that shown in FIG. 17 can be set up between the routing and output stages.

Namely, a routing stage may be constructed in a manner that it includes k first switch units each having j first switch devices and in which respective input terminals of the j first switch devices of each first switch unit are connected in common to corresponding m incoming highways, and each first switch device selectively delivers to its output terminal an inputted packet in accordance with routing information of the packet so that packets of different outgoing highway numbers are delivered out of the output terminals of the respective first switch devices of the respective first switch units, the m outputs of each first switch device being sorted into k groups each having m/k outputs, and an output stage may be constructed in a manner that it includes j second switch units each having k second switch devices and in which m/k cut of m output terminals of each second switch device are connected to corresponding m/k output lines (outgoing highways), output terminals of the respective second switch units are respectively connected to output lines of different outgoing highway numbers, and input terminals of a particular second switch device are connected to output terminals of respective first switch devices which deliver packets of outgoing highway numbers corresponding to the particular second switch device, whereby each first switch unit is connected to all of the second switch units.

A packet coming from an input line is applied simultaneously to j routing stage switch devices of one switch unit. The respective j switch devices of each switch unit correspond to m output lines, and the j switch devices in all, that is, each switch unit has the function of distributing the packet to $j \times m$ output lines. An output port number is described in the header of the packet and is represented by bits which are $\log(j \times m)$ in number. Of $\log(j \times m)$ bits, $\log(j)$ bits are used for selecting one of the switch devices within one switch unit so that only a switch device corresponding to a destining output port number of the packet can be selected. The remaining $\log(m)$ bits are used for routing within the selected switch device. Each switch unit in the output stage has the function of concentrating input signals from the k routing stage switch units. Since the output port number of each output stage switch device is so connected that the same port number as the output port terminal of the routing stage switch device connected to that output stage switch device can be selected as in the case of examples of FIGS. 1 and 13, routing in the output stage switch device can be effected using the same routing information as that for routing in the routing stage switch device.

In accordance with the present embodiment, a (k×m) inputs/(j×m) outputs switch can be constructed using a plurality of m inputs/m outputs switch devices. Further, the number of bits corresponding to the number of output lines suffices to represent the requisite routing information.

For example, where j=1 and m=32, the routing information required for a 2-stage switch is of log32+log32=10 bits according to the prior art but is of log32=5 bits according to the present invention. Since in a high-speed packet switching system to which the invention is applied the number of bits allowed for the routing information in the header is about 8 bits, the aforementioned difference is of significance.

(5) Distributor

The self-routing distributor may be constructed by inverting the aforementioned numerical relation between the input lines and output lines in the concentrator, for example, by inverting the connective relation between the incoming highways and outgoing highways in each of the embodiments of FIGS. 13 and 17. Exemplarily, in order to convert the FIG. 17 embodiment into a distributor, there are provided j×m incoming highways and k×m outgoing highways and m outgoing highways of j switch devices within each output stage switch unit are multi-connected.

Obviously, the invention may be applied to other switching systems than the high-speed switching system.

We claim:

1. A high-speed packet switching system having first switch devices and second switch devices which use fixed length packets each having an information field containing communication information and a header field containing routing information indicative of a destination outgoing highway number, so as to perform switching operation on the basis of the communication information and routing information between a plurality of predetermined input terminals and a plurality of predetermined output terminals whereby switching of the communication information is effected between a plurality of incoming highways and a plurality of outgoing highways in accordance with the routing information contained in said header field, said switching system comprising:

an initial stage including said plurality of first switch devices and in which respective input terminals of said plurality of first switch devices are connected in common to a corresponding incoming highway, and each first switch device selectively delivers to its output terminal an inputted packet in accordance with routing information of said packet so that packets of different outgoing highway numbers are delivered out of the output terminals of the respective first switch devices; and a final stage including said plurality of second switch devices and in which each output terminal of the respective second switch devices is connected to a corresponding outgoing highway, and respective input terminals of a particular second switch device are connected to respective output terminals of the first switch devices which deliver outgoing highways of the same number as the number of outgoing highways connected to said particular second switch device.

2. A high-speed packet switching system having two first switch devices and two second switch devices which use fixed length packets each having an information field containing communication information and a header field containing routing information indicative of a destination outgoing highway number, so as to perform switching operation on the basis of the communication information and routing information between a plurality of predetermined input terminals and a plurality of predetermined output terminals whereby switching of the communication information is effected between a plurality of incoming highways and a plurality of outgoing highways in accordance with the routing information contained in said header field, said switching system comprising:

an initial stage including said two first switch devices and in which each input terminal of said two first switch devices is connected to a corresponding incoming highway, and each first switch device selectively delivers to its output terminal an inputted packet in accordance with routing information of said packet so that packets of different outgoing highway numbers are delivered out of the output terminals of the respective first switch devices; and a final stage including said two second switch devices and in which each output terminal of the respective second switch devices is connected to a corresponding outgoing highway, and respective input terminals of a particular second switch device are connected to respective output terminals of the first switch devices which deliver outgoing highways of the same number as the number of outgoing highways connected to said particular second switch device.

3. A high-speed packet switching system having first switch devices and second switch devices which use fixed length packets each having an information field containing communication information and a header field containing routing information indicative of a destination outgoing highway number, so as to perform switching operation on the basis of the communication information and routing information between m input terminals and m output terminals whereby switching of the communication information is effected between k×m incoming highways and j×m outgoing highways, where k≦m, j≦k and k, j and m are integers, in accordance with the routing information contained in said header field, said switching system comprising:

an initial stage including k first switch units each having j first switch devices and in which respective input terminals of said j first switch devices of each first switch unit are connected in common to corresponding m incoming highways, and each first switch device selectively delivers to its output terminal an inputted packet in accordance with routing information of said packet so that packets of different outgoing highway numbers are delivered out of the output terminals of the respective first switch devices of the respective first switch units, said m outputs of each first switch device being sorted into k groups each having m/k outputs; and an output stage including j second switch units each having k second switch devices and in which m/k out of m output terminals of each second switch device are connected to corresponding m/k output lines, output terminals of the respective second switch units are respectively connected to output lines of different outgoing highway numbers, and input terminals of a particular second switch device are connected to output terminals of respective first switch devices which deliver packets of outgoing highway numbers corresponding to said particular second switch device, whereby each first switch unit is connected to all of said second switch units.

4. A high-speed packet switching system having first switch devices and second switch devices which use fixed length packets each having an information field containing communication information and a header field containing routing information indicative of a destination outgoing highway number, so as to perform switching operation on the basis of the communication information and routing information between m input terminals and m output terminals whereby switching of the communication information is effected between $k \times m$ incoming highways and $k \times m$ outgoing highways, where $k \leq m$ and k and m are integers, in accordance with the routing information contained in said header field, said switching system comprising:

an initial stage including k first switch units each having k first switch devices and in which respective input terminals of said k first switch devices of each first switch unit are connected in common to corresponding m incoming highways, and each first switch device selectively delivers to its output terminal an inputted packet in accordance with routing information of said packet so that packets of different outgoing highway numbers are delivered out of the output terminals of the respective first switch devices of the respective first switch units, said m outputs of each first switch device being sorted into k groups each having m/k outputs; and an output stage including k second switch units each having k second switch devices and in which m/k out of m output terminals of each second switch device are connected to corresponding m/k output circuits, output terminals of the respective second switch units are respectively connected to output lines of different outgoing highway numbers, and input terminals of a particular second switch device are connected to output terminals of respective first switch devices which deliver packets of outgoing highway numbers corresponding to said particular second switch device, whereby each first switch unit is connected to all of said second switch units.

5. A high-speed packet switching system having first switch devices and second switch devices which use fixed length packets each having an information field containing communication information and a header field containing routing information indicative of a destination outgoing highway number, so as to perform switching operation on the basis of the communication information and routing information between m input terminal and m output terminals whereby switching of the communication information is effected between $k \times m$ outgoing highways and $j \times m$ incoming highways, where $k \leq m$, $j \leq k$ and k, j and m are integers, in accordance with the routing information contained in said header field, said switching system comprising:

an output stage including k first switch units each having j first switch devices and in which respective output terminals of said j first switch devices of each first switch unit are connected in common to corresponding m outgoing highways, and each first switch device selectively delivers to its output terminal an inputted packet in accordance with routing information of said packet so that packets of different outgoing highway numbers are delivered out of the output terminals of the respective first switch devices of the respective first switch units, said m inputs of each first switch device being sorted into k groups each having m/k inputs; and an initial stage including j second switch units each having k second switch devices and in which m/k out of m input terminals of each second switch device are connected to corresponding m,k, input lines, input terminals of the respective second switch units are respectively connected to input lines of different outgoing highway numbers, and output terminals of a particular second switch device are connected to input terminals of respective first switch devices which receive packets of outgoing highway numbers corresponding to said particular second switch device, whereby each second switch unit is connected to all of said first switch units.

6. A switching system comprising:
a plurality of local units; and
a tandem unit connected to each of said plurality of local units,
each of said local unit and tandem unit having a switching system as recited in claim 3.

7. A high-speed packet switching system having first switch devices and second switch devices which use fixed length packets each having an information field containing communication information and a header field containing routing information indicative of a destination outgoing highway number, so as to perform switching operation between a plurality of predetermined input terminals and a plurality of predetermined output terminals whereby switching of the communication information is effected between a plurality of incoming highways and a plurality of outgoing highways in accordance with the routing information contained in said header field, said switching system comprising:

an initial stage including said plurality of first switch devices and in which respective input terminals of said plurality of first switch devices are connected in common to a corresponding incoming highway, and each first switch device selectively delivers to its output terminal an inputted packet in accordance with routing information of said packet; and a final stage including said plurality of second switch devices and in which each output terminal of the respective second switch devices is connected to a corresponding outgoing highway, and respective input terminals of a particular second switch device are connected to respective output terminals of the first switch devices having the same number as the number of outgoing highways connected to said particular second switch device.

8. A high-speed packet switching system having first switch devices and second switch devices which use fixed length packets each having an information field containing communication information and a header field containing routing information indicative of a destination outgoing highway number, so as to perform switching operation between a plurality of predetermined input terminals and a plurality of predetermined output terminals whereby switching of the communication information is effected between a plurality of incoming highways and a plurality of outgoing highways in accordance with the routing information contained in said header field, said switching system comprising:

an initial stage including said plurality of first switch devices and in which respective input terminals of said plurality of first switch devices are connected in common to a corresponding incoming highway, and each first switch device selectively delivers to its output terminal an inputted packet in accordance with routing information of said packet; and a final stage including said plurality of second switch devices and in which each output terminal of the respective sound switch devices is connected to a corresponding outgoing highway, and respective input terminals of a particular second switch device are connected to respective output terminals of the first switch devices, said respective output terminals connected to said particular second switch being of the same number as the number of outgoing highways connected to the output terminals of said particular second switch.

9. A high-speed packet switching system having two first switch devices and two second switch devices which use fixed length packets each having an information field containing communication information and a header field containing routing information indicative of a destination outgoing highway number, so as to perform switching operation between a plurality of predetermined input terminals and a plurality of predetermined output terminals whereby switching of the communication information is effected between a plurality of incoming highways and a plurality of outgoing highways in accordance with the routing information contained in said header field, said switching system comprising:

an initial stage including said two first switch devices and in which each input terminal of said two first switch devices is connected to a corresponding incoming highway, and each first switch device selectively delivers to its output terminal an inputted packet in accordance with routing information of said packet; and a final stage including said two second switch devices and in which each output terminal of the respective second switch devices is connected to a corresponding outgoing highway, and respective input terminals of a particular second switch device are connected to respective output terminals of the first switch devices having the same number as the number of outgoing highways connected to said particular second switch device.

10. A high-speed packet switching system having first switch devices and second switch devices which use fixed length packets each having an information field containing communication information and a header field containing routing information indicative of a destination outgoing highway number, so as to perform switching operation between m input terminals and m output terminals whereby switching of the communication information is effected between $k \times m$ incoming highways and $j \times m$ outgoing highways, where $k \leq m$, $j \leq k$ and k, j and m are integers, in accordance with the routing information contained in said header field, said switching system comprising:

an initial stage including k first switch units each having j first switch devices and in which respective input terminals of said j first switch devices of each first switch unit are connected in common to corresponding m incoming highways, and each first switch device selectively delivers to its output terminal an inputted packet in accordance with routing information of said packet, said m outputs of each first switch device being sorted into k groups each having m/k outputs; and an output stage including j second switch units each having k second switch devices and in which m/k out of m output terminals of each second switch device are connected to corresponding m/k output lines, output terminals of the respective second switch units are respectively connected to output lines of different outgoing highway numbers, and input terminals of a particular second switch device are connected to output terminals of respective first switch devices which are given the same numbers corresponding to said particular second switch device, whereby each first switch unit is connected to all of said second switch units.

11. A high-speed packet switching system having two first switch devices and two second switch devices which use fixed length packets each having an information field containing communication information and a header field containing routing information indicative of a destination outgoing highway number, so as to perform switching operation between a plurality of predetermined input terminals and a plurality of predetermined output terminals whereby switching of the communication information is effected between a plurality of incoming highways and a plurality of outgoing highways in accordance with the routing information contained in said header field, said switching system comprising:

an initial stage including said two first switch devices and in which each input terminal of said two first switch devices is connected to a corresponding incoming highway, and each first switch device selectively delivers to its output terminal an inputted packet in accordance with routing information of said packet; and a final stage including said two second switch devices and in which each output terminal of the respective second switch devices is connected to a corresponding outgoing highway, and respective input terminals of a particular second switch device are connected to respective output terminals of the first switch devices.

12. A high-speed packet switching system having first switch devices and second switch devices which use fixed length packets each having an information field containing communication information and a header field containing routing information indicative of a destination outgoing highway number, so as to perform switching operation between m input terminals and m output terminals whereby switching of the communication information is effected between $k \times m$ incoming highways and $j \times m$ outgoing highways, where $k \leq m$, $j \leq k$ and k, j and m are integers, in accordance with the routing information contained in said header field, said switching system comprising:

an initial stage including k first switch units each having j first switch devices and in which respective input terminals of said j first switch devices of each first switch unit are connected in common to corresponding m incoming highways, and each first switch device selectively delivers to its output terminal an inputted packet in accordance with routing information of said packet, said m outputs of each first switch device being sorted into k groups each having m/k outputs; and an output stage including j second switch units each having k second switch devices and in which m/k out of m output terminals of each second switch device are connected to corresponding m/k output lines, output terminals of the respective second switch units are respectively connected to output lines of different outgoing highway numbers, and input terminals of a particular second switch device are connected to output terminals of respective first switch devices, whereby each first switch unit is connected to all of said second switch units.

13. A packet switching method, in a high-speed packet switching system having first switch devices and second switch devices which use fixed length packets each having an information field containing communication information and a header field containing routing information indicative of a destination outgoing highway number, of performing switching operation between a plurality of predetermined input terminals and a plurality of predetermined output terminals, whereby switching of the communication information is effected between a plurality of incoming highways and a plurality of outgoing highways in accordance with the routing information contained in said header, comprising the steps of:

selectively delivering, to an output terminal in each first switch device, an inputted packet in accordance with routing information of said packet so that packets of different outgoing highway numbers are delivered out of output terminals of respective first switch devices, said first switch devices being included in an initial stage in which respective input terminals of said first switch devices are connected in common to a corresponding incoming highway; and delivering packets, from outgoing highways connected to a respective output terminals of the first switch devices, in each second switch device, to outgoing highways connected to output terminals of said second switch device, said second switch devices being included in a final stage in which each output terminal of the respective second switch devices is connected to a corresponding outgoing highway, and respective input terminals of a particular second switch device are connected to respective output terminals of the first switch devices.

14. A packet switching method, in a high-speed packet switching system having two first switch devices and two second switch devices which use fixed length packets each having an information field containing communication information and a header field containing routing information indicative of a destination outgoing highway number, of performing switching operation between a plurality of predetermined input terminals and a plurality of predetermined output terminals, whereby switching of the communication information is effected between a plurality of incoming highways and a plurality of outgoing highways in accordance with the routing information contained in said header field, comprising the steps of:

selectively delivering, to an output terminal in each first switching device, an inputted packet in accordance with routing information of said packet so that packets of different outgoing highway numbers are delivered out of the output terminals of the respective first switch devices, said first switch devices being included in an initial stage in which each input terminal of said two first switch devices is connected to a corresponding incoming highway;

delivering packets, from outgoing highways connected to respective output terminals of the first switch devices, in each second switch device, to outgoing highways connected to output terminals of said second switch device, said second switch devices being included in a final stage in which each output terminal of the respective second switch devices is connected to a corresponding outgoing highway, and respective input terminals of a particular second switch device are connected to respective output terminals of the first switch devices.

15. A packet switching, in a high-speed packet switching system having first switch devices and second switch devices which use fixed length packets each having an information field containing communication information and a header field containing routing information indicative of a destination outgoing highway number, of performing switching operation on the basis of the communication information and routing information between m input terminals and m output terminals, whereby switching of the communication information is effected between $k \times m$ incoming highways and $j \times m$ outgoing highways, where $k \leq m$, $j \leq k$ and k, j and m are integers, in accordance with the routing information contained in said header field, comprising the steps of:

selectively delivering, to an output terminal in each first switch device, an inputted packet in accordance with routing information of said packet so that packets of different outgoing highway numbers are delivered out of the output terminals of the respective first switch devices of the respective first switch units, said m outputs of each first switch device being sorted into k groups each having m/k outputs, said k first switch units each having; first switch devices being included in an initial stage in which respective input terminals of said j first switch devices of each first switch unit are connected in common to corresponding m incoming highways; and delivering packets, from outgoing highways connected to respective output terminals of the first switch devices, in each second switch device, to outgoing highways connected to output terminals of said second switch device, said j second switch units each having k second switch devices being included in an output stage in which m/k out of m output terminals of each second switch device are connected to corresponding m/k output lines, output terminals of the respective second switch units are respectively connected to output lines of different outgoing highway numbers, and input terminals of a particular second switch device are connected to output terminals of respective first switch devices, whereby each first switch unit is connected to all of said second switch units.

* * * * *